(12) United States Patent
Masuda et al.

(10) Patent No.: US 12,437,927 B2
(45) Date of Patent: Oct. 7, 2025

(54) ELECTRONIC DEVICE WITH A CERAMIC ELEMENT AND SURFACE-MOUNT TERMINALS

(71) Applicant: TDK CORPORATION, Tokyo (JP)

(72) Inventors: Akihiro Masuda, Tokyo (JP); Shinya Ito, Tokyo (JP); Norihisa Ando, Tokyo (JP); Hideki Kaneko, Tokyo (JP); Ken Aburakawa, Tokyo (JP); Kenya Tamaki, Tokyo (JP); Akitoshi Yoshii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 204 days.

(21) Appl. No.: 18/331,294

(22) Filed: Jun. 8, 2023

(65) Prior Publication Data

US 2023/0411077 A1   Dec. 21, 2023

(30) Foreign Application Priority Data

Jun. 15, 2022 (JP) .................................. 2022-096631

(51) Int. Cl.
*H01G 4/224* (2006.01)
*H01G 4/228* (2006.01)

(52) U.S. Cl.
CPC ............. *H01G 4/224* (2013.01); *H01G 4/228* (2013.01)

(58) Field of Classification Search
None
See application file for complete search history.

(56) References Cited

U.S. PATENT DOCUMENTS

| | | | | |
|---|---|---|---|---|
| 2,830,698 A | * | 4/1958 | Coda | H01G 4/228 361/321.1 |
| 2,899,611 A | * | 8/1959 | Bradley et al. | H01G 2/12 174/650 |
| 4,255,779 A | * | 3/1981 | Meal | H01G 4/228 361/309 |
| 4,622,619 A | * | 11/1986 | Schilling | H01G 4/224 29/25.42 |
| 2003/0037962 A1 | * | 2/2003 | Kayatani | H01G 4/228 257/E23.017 |

(Continued)

FOREIGN PATENT DOCUMENTS

| | | | |
|---|---|---|---|
| JP | H06-196348 A | | 7/1994 |
| JP | 09036689 A | * | 2/1997 |

*Primary Examiner* — Eric W Thomas
(74) *Attorney, Agent, or Firm* — Oliff PLC

(57) ABSTRACT

The electronic device includes: a case including a recessed portion and an opening edge portion of the recessed portion; a ceramic element arranged in the recessed portion, having a first main surface and a second main surface facing each other, and including a first electrode portion formed on the first main surface and a second electrode portion formed on the second main surface; a first metal terminal including a first mounting portion, arranged in the opening edge portion and approximately horizontal with respect to the first main surface and the second main surface, and a first electrode connection portion connected to the first electrode portion; and a second metal terminal including a second mounting portion, arranged in the opening edge portion and approximately horizontal with respect to the first main surface and the second main surface, and a second electrode connection portion connected to the second electrode portion.

8 Claims, 12 Drawing Sheets

(56) References Cited

U.S. PATENT DOCUMENTS

2018/0033557 A1\* 2/2018 Chien .................... H01G 4/236
2018/0374641 A1\* 12/2018 Akiyoshi ............. H03H 9/1042
2020/0203076 A1\* 6/2020 Ando ..................... H01G 4/228

\* cited by examiner

ELECTRONIC DEVICE WITH A CERAMIC ELEMENT AND SURFACE-MOUNT TERMINALS

BACKGROUND OF THE INVENTION

Field of the Invention

The present invention relates to an electronic device used as a capacitor and the like.

Description of the Related Art

Conventionally, a capacitor and the like formed by connecting metal terminals to a single-plate dielectric disk has been proposed. In addition, an electronic device has been proposed in which the periphery of such a dielectric disk is molded with an exterior material to have a form suitable for surface mounting.

However, the conventional electronic devices for surface mounting require a process of molding the dielectric disk or the metal terminals with an exterior material after fixing the dielectric disk or the metal terminals in a cavity for resin molding. For this reason, there is a problem that the assembly process is complicated. In addition, since it is necessary to change the molding die according to changes in the size of the dielectric disk, there is a problem that it is difficult to respond flexibly to changes in the size of the dielectric disk and the like.

CITATION LIST

Patent Document 1: JP H6-196348 A

BRIEF SUMMARY OF THE INVENTION

The present invention has been made in view of such circumstances, and it is an object of the present invention to provide an electronic device that can respond flexibly to changes in the size of an internal ceramic element and the like and is good in terms of productivity.

In order to solve the aforementioned problems, an electronic device according to the present invention includes: a case including a recessed portion and an opening edge portion of the recessed portion; a ceramic element arranged in the recessed portion, having a first main surface and a second main surface facing each other, and including a first electrode portion formed on the first main surface and a second electrode portion formed on the second main surface; a first metal terminal including a first mounting portion arranged on the opening edge portion and approximately parallel to the first main surface and the second main surface, and a first electrode connection portion connected to the first electrode portion; and a second metal terminal including a second mounting portion arranged on the opening edge portion and approximately horizontal with respect to the first main surface and the second main surface, and a second electrode connection portion connected to the second electrode portion.

In the electronic device according to the present invention, the ceramic element is housed in the recessed portion of the case. Therefore, since there is no need for a step of arranging the ceramic element and the like in a cavity for resin molding and performing molding with an exterior material, good productivity is obtained. In addition, since the main surface of the ceramic element is horizontal with respect to the mounting portion, this is advantageous from the viewpoint of reducing the height of the component. In addition, since the first mounting portion and the second mounting portion are arranged in the opening edge portion, the lengths from the first electrode connection portion and the second electrode connection portion to the first mounting portion and the second mounting portion are shortened. As a result, the resistance value at the metal terminals can be reduced.

In addition, for example, a recessed portion depth, which is a distance from an opening of the case to a bottom surface of the recessed portion, is larger than an element thickness, which is a distance between the first main surface and the second main surface.

In such an electronic device, the entire ceramic element can be housed in the recessed portion without being exposed from the opening of the recessed portion. In addition, when filling the recessed portion with mold resin, the entire ceramic element can be covered with the mold resin.

In addition, for example, the ceramic element includes a first portion having the first main surface, the first electrode portion, and a first dielectric portion, and a second portion having the second main surface, the second electrode portion, and a second dielectric portion, and the first portion and the second portion are connected to each other through an intermediate electrode portion.

The ceramic element arranged in the recessed portion may be a single-plate ceramic element, or may be a combination of a plurality of plate-like portions, such as the first portion and the second portion. Such an electronic device forms an electronic device in which a first dielectric portion and a second dielectric portion are connected in series to each other.

In addition, for example, the ceramic element includes a first element portion and a second element portion each having the first main surface and the second main surface, the second main surface of the first element portion and the second main surface of the second element portion are arranged to face each other, the second electrode connection portion is interposed between the second main surface of the first element portion and the second main surface of the second element portion so as to be in contact with the second electrode portion of the first element portion and the second electrode portion of the second element portion, and the first electrode connection portion includes a first element connection portion connected to the first electrode portion of the first element portion and a second element connection portion connected to the first electrode portion of the second element portion.

The ceramic element arranged in the recessed portion may be a single-plate dielectric, or may be a combination of a plurality of plate-like dielectrics, such as the first element portion and the second element portion. Such an electronic device forms an electronic device in which a first element portion and a second element portion are connected in parallel to each other.

In addition, for example, the first metal terminal includes a first terminal arm portion for connecting the first electrode connection portion and the first mounting portion to each other, and an insulating member is arranged between the second electrode portion and the first terminal arm portion in the recessed portion.

In the electronic device, there may be a problem that the terminal arm portion of the metal terminal connected to one electrode portion passes near the other electrode portion in order to partially expose the first and second metal terminals from the opening of the recessed portion. However, due to the insulating member being arranged between the second electrode portion and the first terminal arm portion, such an electronic device can have a suitable insulation property.

In addition, for example, a groove portion is provided in the case to open to the recessed portion and to open from the opening edge portion, and at least one end of the insulating member is in the groove portion.

In such an electronic device, the insulating member can be easily and accurately positioned. Therefore, good insulation property and productivity are obtained.

In addition, for example, in the electronic device, at least a part of the opening edge portion on the case is visible from below.

Since such an electronic device has a simple structure in which at least a part of the opening edge portion of the recessed portion is exposed, good productivity is obtained.

In addition, for example, the first metal terminal includes a first folded portion extending upward along an outer side surface of the case from a distal end of the first mounting portion, and the second metal terminal includes a second folded portion extending upward along an outer side surface of the case from a distal end of the second mounting portion.

The electronic device including such metal terminals has good mountability because a solder fillet is easily formed during mounting.

DETAILED DESCRIPTION OF THE INVENTIONS

Hereinafter, the present invention will be described based on embodiments shown in the diagrams.

First Embodiment

Figure 1:
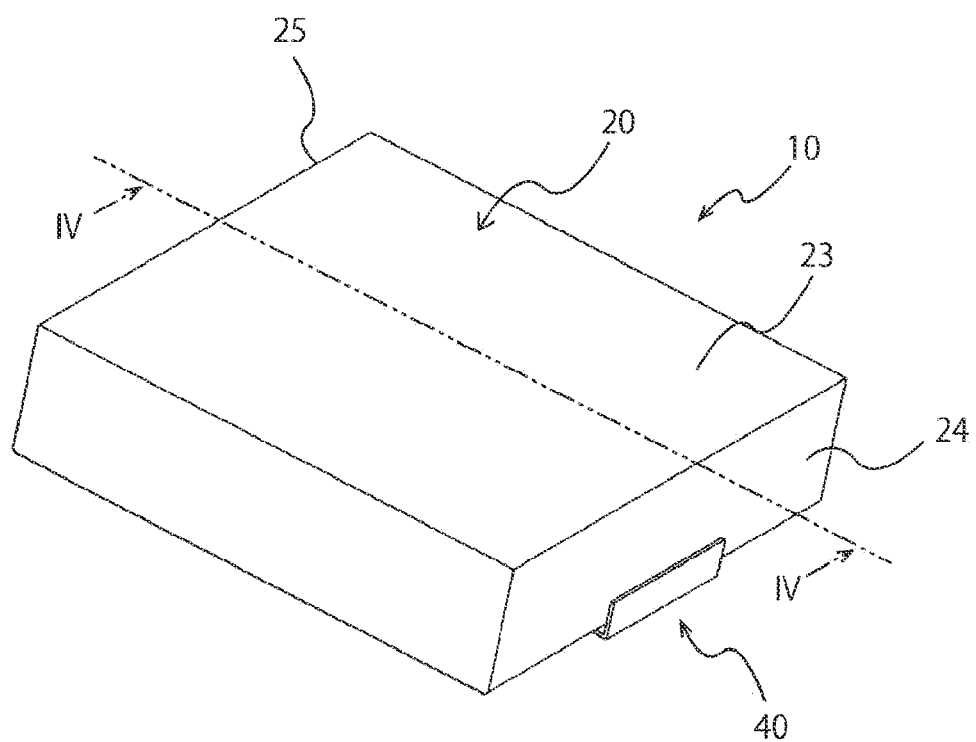
FIG. 1 is a schematic perspective view of an electronic device according to a first embodiment when viewed obliquely from above.
Figure 2:
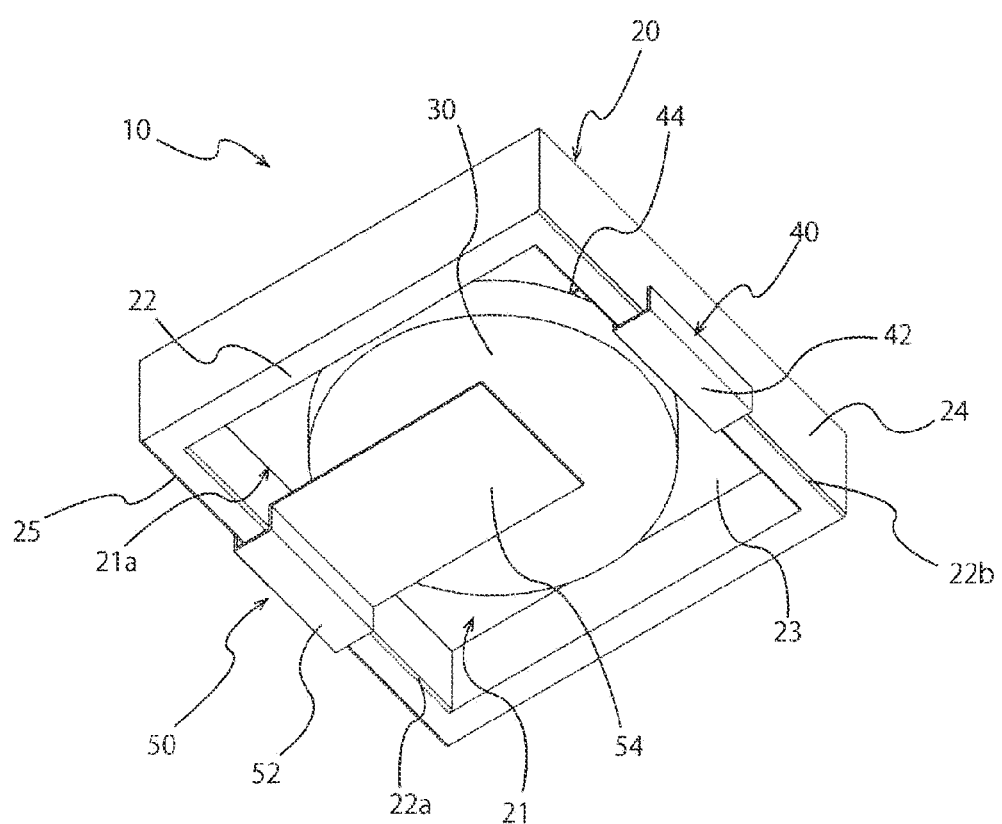
FIG. 2 is a perspective view of the electronic device shown in FIG. 1 when viewed obliquely from below.

FIG. 1 is a schematic perspective view of an electronic device 10 according to a first embodiment when viewed obliquely from above, and FIG. 2 is a schematic perspective view of the electronic device 10 when viewed obliquely from below. As shown in FIGS. 1 and 2, the electronic device 10 includes a case 20 and a ceramic element 30 arranged in a recessed portion 21 of the case 20. In addition, as can be understood from FIG. 2, the electronic device 10 includes a first metal terminal 40 and a second metal terminal 50 that are connected to the ceramic element 30 arranged in the recessed portion 21.

As shown in FIGS. 1 and 2, the electronic device 10 has an approximately rectangular flat plate shape or a rectangular parallelepiped shape in which the lengths in two of the three directions are approximately equal and the length in one direction is shorter than the lengths in the other two directions. However, the electronic device 10 is not limited to this, and may have a polygonal flat plate shape other than the rectangle, or may have a disk shape, an elliptical disk shape, a prism shape, or other shapes. As can be understood from FIGS. 1 and 2, in the electronic device 10, the side where an opening 21a of the recessed portion 21 formed in the case 20 is formed is a mounting surface side facing a substrate and the like that is a mounting target when mounting the electronic device 10.

As shown in FIG. 2, the case 20 includes the recessed portion 21 and an opening edge portion 22 surrounding the opening 21a of the recessed portion 21. As shown in FIG. 2, the opening 21a of the recessed portion 21 is formed on one of two narrow surfaces of the case 20, not four narrow surfaces thereof. Therefore, the height of the electronic device 10 can be reduced.

As shown in FIG. 2, in the case 20, the ceramic element 30 and the like are housed inside the recessed portion 21. The opening 21a of the recessed portion 21 has a rectangular shape smaller than the outer shape of the case 20. In addition, as shown in FIG. 2, the recessed portion 21 forms an approximately rectangular parallelepiped space inside the case 20. As shown in FIGS. 1 and 2, an upper base 23 of the case 20 is formed above the electronic device 10 in a direction opposite to the opening 21a of the recessed portion 21.

As shown in FIG. 2, the opening edge portion 22 is formed by a frame-shaped flat surface surrounding the opening 21a. The opening edge portion 22 is approximately parallel to a first main surface 31a and a second main surface 31b of the ceramic element 30, which will be described later. In addition, the shape of the opening edge portion 22 may be different from the shape of the opening edge portion 22 shown in FIG. 2 depending on the shape of the opening 21a, the outer peripheral shape of the case 20, and the like.

Figure 3:
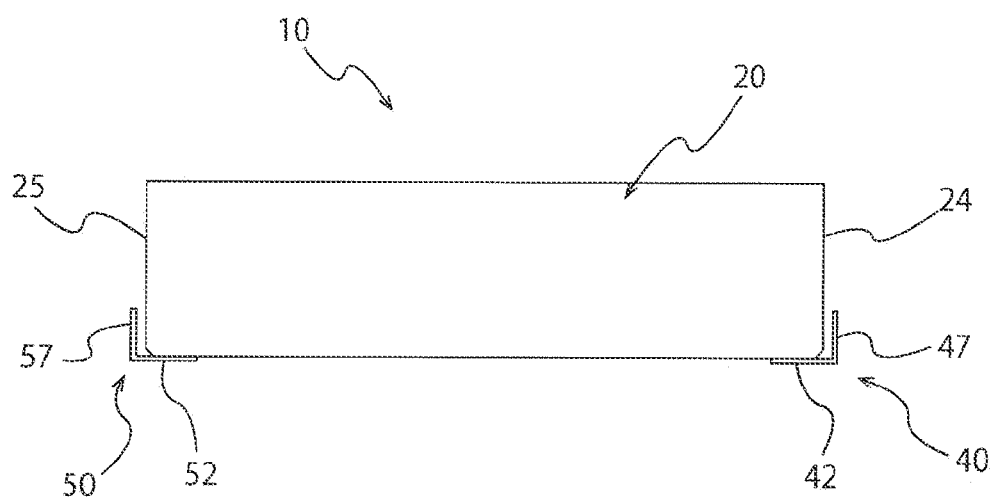
FIG. 3 is a side view of the electronic device shown in FIG. 1.

FIG. 3 is a side view of the electronic device 10. As shown in FIGS. 2 and 3, a first mounting portion 42 of the first metal terminal 40 and a second mounting portion 52 of the second metal terminal 50 are arranged in the opening edge portion 22.

Figure 4:
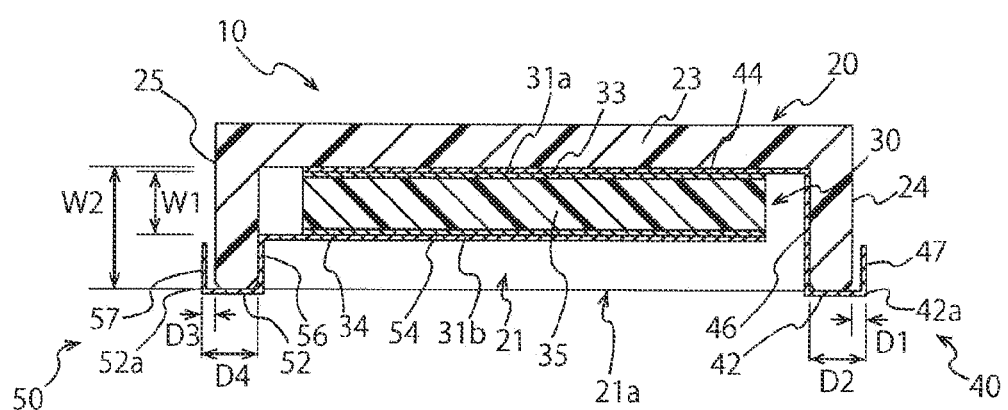
FIG. 4 is a cross-sectional view of the electronic device shown in FIG. 1.

FIG. 4 is a cross-sectional view through a cross section passing through the approximate center of the electronic device 10 and perpendicular to a first outer side surface 24 and a second outer side surface 25. As shown in FIGS. 2 and 4, the ceramic element 30 is arranged in the recessed portion 21 of the case 20. As shown in FIG. 4, the ceramic element 30 has the first main surface 31a and the second main surface 31b facing each other, and has an approximately disk-like outer shape. However, the ceramic element 30 may have a shape other than the disk shape, such as an elliptical disk shape or a rectangular flat plate shape. In addition, the first main surface 31a and the second main surface 31b are a pair of surfaces having the largest area in the ceramic element 30. In addition, as shown in FIG. 4, in the description of the ceramic element 30, one of the two main surfaces facing upward where the upper base 23 of the case 20 is located is referred to as the first main surface 31a, and the other main surface facing downward, which is the mounting surface side, is referred to as the second main surface 31b. However, the first main surface 31a and the second main surface 31b may be interchanged with respect to the state shown in the diagram.

As shown in FIG. 4, which is a cross-sectional view of the electronic device 10, the ceramic element 30 includes a first electrode portion 33 formed on the first main surface 31a, a second electrode portion 34 formed on the second main surface 31b, and a dielectric portion 35 interposed between the first electrode portion 33 and the second electrode portion 34. The material of the dielectric portion 35 is not particularly limited. For example, the dielectric portion 35 is formed of a dielectric material such as calcium titanate, strontium titanate, barium titanate, or a mixture thereof. In addition, the ceramic element 30 is not limited to a capacitor and the like in which the dielectric portion 35 is interposed between the first electrode portion 33 and the second electrode portion 34. For example, the ceramic element may be a varistor or a thermistor in which a semiconductor ceramic is interposed between a first electrode portion and a second electrode portion.

The materials of the first electrode portion 33 and the second electrode portion 34 are not particularly limited, and copper, a copper alloy, nickel, a nickel alloy, and the like are usually used. However, silver, an alloy of silver and palladium, and the like can also be used. The thicknesses of the first electrode portion 33 and the second electrode portion 34 are usually about 10 to 50 µm although the thicknesses are not particularly limited. In addition, a metal coating film containing at least one selected from Ni, Cu, Sn, and the like may be formed on the surfaces of the first electrode portion 33 and the second electrode portion 34.

As shown in FIG. 4, the ceramic element 30 is arranged in the recessed portion 21 so that the second main surface 31b faces the same direction as the opening direction of the opening 21a and the first main surface 31a faces a direction opposite to the opening direction of the opening 21a. Therefore, a recessed portion depth W2, which is a distance from the opening 21a of the case 20 to the upper base 23 of the recessed portion 21, is larger than an element thickness W1, which is a distance between the first main surface 31a and the second main surface 31b of the ceramic element 30. Therefore, in the electronic device 10, the entire ceramic element 30 can be housed in the recessed portion 21 without a part of the ceramic element 30 being exposed from the opening 21a of the recessed portion 21. In addition, in the electronic device 10, the recessed portion 21 may be filled with mold resin. In such a case, the entire ceramic element 30 can be covered with the mold resin.

As shown in FIG. 4, the case 20 does not have a lid that closes the opening 21a. Therefore, as shown in FIG. 2, in the electronic device 10, at least a part of the opening edge portion 22 in the case 20, that is, a remaining portion of the opening edge portion 22 excluding a portion where the first mounting portion 42 and the second mounting portion 52 are arranged can be seen from below. Thus, the case 20 does not have a lid attached thereto. Due to the simple shape, the electronic device 10 is good in terms of productivity.

As shown in FIG. 2, the electronic device 10 has a pair of metal terminals that are the first metal terminal 40 and the second metal terminal 50. As shown in FIGS. 2 and 4, the first metal terminal 40 and the second metal terminal 50 are arranged so as to be spaced apart from each other in the electronic device 10, thereby being electrically insulated from each other. The first metal terminal 40 and the second metal terminal 50 are formed, for example, by machining a conductive metal plate material. However, the method of forming the first and second metal terminals 40 and 50 is not particularly limited.

As shown in FIG. 4, the first metal terminal 40 includes the first mounting portion 42 arranged in the opening edge portion 22, a first electrode connection portion 44 connected to the first electrode portion 33 of the ceramic element 30, a first terminal arm portion 46 that connects the first mounting portion 42 and the first electrode connection portion 44 to each other, and a first folded portion 47 extending upward from a distal end 42a of the first mounting portion 42. As shown in FIG. 4, the first electrode connection portion 44 and the first terminal arm portion 46 are housed in the recessed portion 21 of the case 20 similar to the ceramic element 30.

As shown in FIGS. 2 and 4, the first electrode connection portion 44 extends approximately parallel to the first main surface 31a of the ceramic element 30, and is connected to the first electrode portion 33 formed on the first main surface 31a through solder, conductive adhesive, or the like. On the other hand, the first mounting portion 42 is arranged on one side of the opening edge portion 22 (on the first outer side surface 24 side of the case 20).

As shown in FIG. 4, the first terminal arm portion 46 of the first metal terminal 40 connects the first electrode connection portion 44 inside the recessed portion 21 and the first mounting portion 42 outside the recessed portion 21 to each other. In addition, as shown in FIGS. 2 and 4, the first mounting portion 42 is approximately parallel to the first main surface 31a and the second main surface 31b of the ceramic element 30.

As shown in FIGS. 2 to 4, the case 20 has the first outer side surface 24 and the second outer side surface 25 perpendicular to the first main surface 31a and the second main surface 31b of the ceramic element 30 and the first mounting portion 42 and the second mounting portion 52 of the first metal terminal 40 and the second metal terminal 50. That is, the first outer side surface 24 and the second outer side surface 25 are a pair of outer side surfaces facing each other among the four outer side surfaces of the case 20. In addition, among the outer surfaces of the case 20, surfaces perpendicular to the opening edge portion 22 are the outer side surfaces.

As shown in FIG. 4, the distal end 42a of the first mounting portion 42 is an end on a side opposite to a side of the first mounting portion 42 connected to the first terminal arm portion 46, and is connected to the first folded portion 47. A distance D1 from the distal end 42a of the first mounting portion 42 to the first outer side surface 24 is shorter than a distance D2 from the distal end 42a of the first mounting portion 42 to the recessed portion 21. Such a first mounting portion 42 can have a predetermined area or more along the opening edge portion 22. Therefore, good mountability is obtained.

As shown in FIG. 4, the first folded portion 47 of the first metal terminal 40 extends upward along the first outer side surface 24 of the case 20 from the distal end 42a of the first mounting portion 42. Since the first metal terminal 40 includes the first folded portion 47, a solder fillet is easily formed during mounting. Therefore, the electronic device 10 including such a first folded portion 47 has good mountability. In addition, as shown in FIG. 4, since the first terminal arm portion 46, the first mounting portion 42, and the first folded portion 47 are provided, the distal end of the first metal terminal 40 has a J shape. For this reason, in the electronic device 10, a part of the case 20 is interposed between the first terminal arm portion 46 and the first folded portion 47. Therefore, the first metal terminal 40 can be more strongly engaged with or fixed to the case 20. In addition, the solder fillet formed on the first folded portion 47 is easily detected by image inspection or the like. Therefore, the first metal terminal 40 including the first folded portion 47 is also advantageous from the viewpoint of automating the mounting process.

As shown in FIGS. 2 to 4, the second metal terminal 50 includes the second mounting portion 52 arranged in the opening edge portion 22, a second electrode connection portion 54 connected to the second electrode portion 34 of the ceramic element 30, a second terminal arm portion 56 that connects the second mounting portion 52 and the second electrode connection portion 54 to each other, and a second folded portion 57 extending upward from a distal end 52a of the second mounting portion 52. The second electrode connection portion 54 is housed in the recessed portion 21 of the case 20 similar to the first electrode connection portion 44.

As shown in FIGS. 2 and 4, the second electrode connection portion 54 extends approximately parallel to the second main surface 31b of the ceramic element 30, and is connected to the second electrode portion 34 formed on the second main surface 31b through solder, conductive adhesive, or the like. On the other hand, the second mounting portion 52 is arranged on the other side of the opening edge portion 22 (on the second outer side surface 25 side of the case 20).

As shown in FIG. 4, the second terminal arm portion 56 of the second metal terminal 50 connects the second electrode connection portion 54 inside the recessed portion 21 and the second mounting portion 52 outside the recessed portion 21 to each other. In addition, as shown in FIGS. 2 and 4, the second mounting portion 52 is approximately parallel to the first main surface 31a and the second main surface 31b of the ceramic element 30.

As shown in FIG. 4, the distal end 52a of the second mounting portion 52 is an end on a side opposite to a side of the second mounting portion 52 connected to the second terminal arm portion 56, and is connected to the second folded portion 57. A distance D3 from the distal end 52a of the second mounting portion 52 to the second outer side surface 25 is shorter than a distance D4 from the distal end 52a of the second mounting portion 52 to the recessed portion 21. Such a second mounting portion 52 can have a predetermined area or more along the opening edge portion 22. Therefore, good mountability is obtained.

As shown in FIGS. 2 and 4, the second folded portion 57 of the second metal terminal 50 extends upward along the second outer side surface 25 of the case 20 from the distal end 52a of the second mounting portion 52. The second metal terminal 50 including the second folded portion 57 has the same effects as the first metal terminal 40 including the first folded portion 47.

Figure 12:
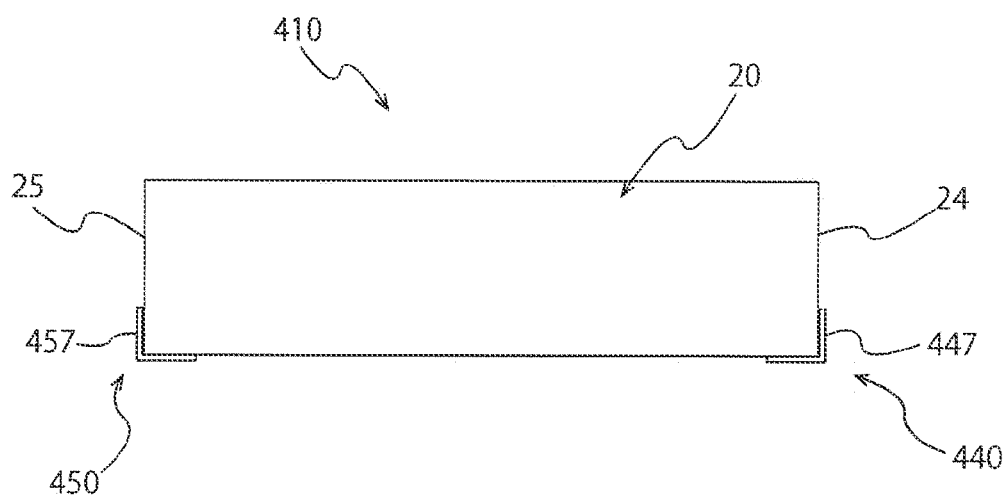
FIG. 12 is a side view of an electronic device according to a modification example.

In addition, as shown in FIG. 3, a predetermined gap may be formed between the first folded portion 47 and the first outer side surface 24 and between the second folded portion 57 and the second outer side surface 25. By forming such a gap, when the first metal terminal 40 and the second metal terminal 50 are assembled to the case 20, appropriate dimensional variations are allowed to realize smooth assembly. However, as shown in FIG. 12, which is a side view of an electronic device 410 that is a modification example, a first folded portion 447 of a first metal terminal 440 and a second folded portion 457 of a second metal terminal 450 may be in contact with the first outer side surface 24 and the second outer side surface 25, respectively.

In addition, as shown in FIG. 2, a chamfered portion 22a is formed at the end of the opening edge portion 22 on the recessed portion 21 side, and a chamfered portion 22b is formed at the end of the opening edge portion 22 on the first and second outer side surfaces 24 and 25 side. The formation of the chamfered portions 22a and 22b in the opening edge portion 22 contributes to smooth assembly of the first metal terminal 40 and the second metal terminal 50 to the case 20. In addition, the chamfered portions 22a and 22b may be rounded, and the chamfered portions 22a and 22b may not be formed in the opening edge portion 22.

The materials of the first metal terminal 40 and the second metal terminal 50 shown in FIGS. 2, 4, and the like are not particularly limited as long as these are metal materials having electrical conductivity. For example, iron, nickel, copper, silver, or alloys containing these can be used. In addition, a metal coating film containing Ni, Sn, Cu, or the like may be formed on the surfaces of the first metal terminal 40 and the second metal terminal 50.

The recessed portion 21 of the case 20 shown in FIGS. 2 and 4 may be filled with mold resin that fills the gaps between the inner wall of the recessed portion 21 and the ceramic element 30 and each of the first and second metal terminals 40 and 50. Therefore, the strength, insulation, and the like of the electronic device 10 can be improved. However, the recessed portion 21 may not be filled with resin. As shown in FIG. 2, a gap may be formed between the inner wall of the recessed portion 21 and the ceramic element 30 and each of the first and second metal terminals 40 and 50.

The case 20 can be manufactured, for example, by injection molding using resin. However, the material of the case 20 is not limited to resin.

The electronic device 10 shown in FIGS. 1 to 4 can be manufactured, for example, by the following steps. First, the ceramic element 30, the first metal terminal 40, and the second metal terminal 50 are prepared, and the first metal terminal 40 and the second metal terminal 50 are connected to the ceramic element 30. The connection between the ceramic element 30 and each of the first metal terminal 40 and the second metal terminal 50 can be made by using solder, a conductive adhesive, or the like.

Then, an intermediate product in which the first metal terminal 40, the second metal terminal 50, and the ceramic element 30 are integrated is arranged in the recessed portion 21 of the case 20. Thereafter, if necessary, mold resin is injected into the recessed portion 21 to obtain the electronic device 10 shown in FIG. 1. As described above, in the electronic device 10 shown in FIGS. 1 to 4, the ceramic element 30 is housed in the recessed portion 21 of the case 20. Therefore, since there is no need for a step of arranging the ceramic element 30 and the like in a cavity for resin molding and performing molding with an exterior material, good productivity is obtained.

In the electronic device 10, the ceramic element 30 and the like can be housed in the case 20. Therefore, the size of the ceramic element 30 can be flexibly changed as long as the ceramic element 30 can be housed in the case 20. In addition, since the first mounting portion 42 and the second mounting portion 52 are parallel to the first main surface 31a and the second main surface 31b of the ceramic element 30, the electronic device 10 is advantageous in terms of height reduction.

Second Embodiment

Figure 5:
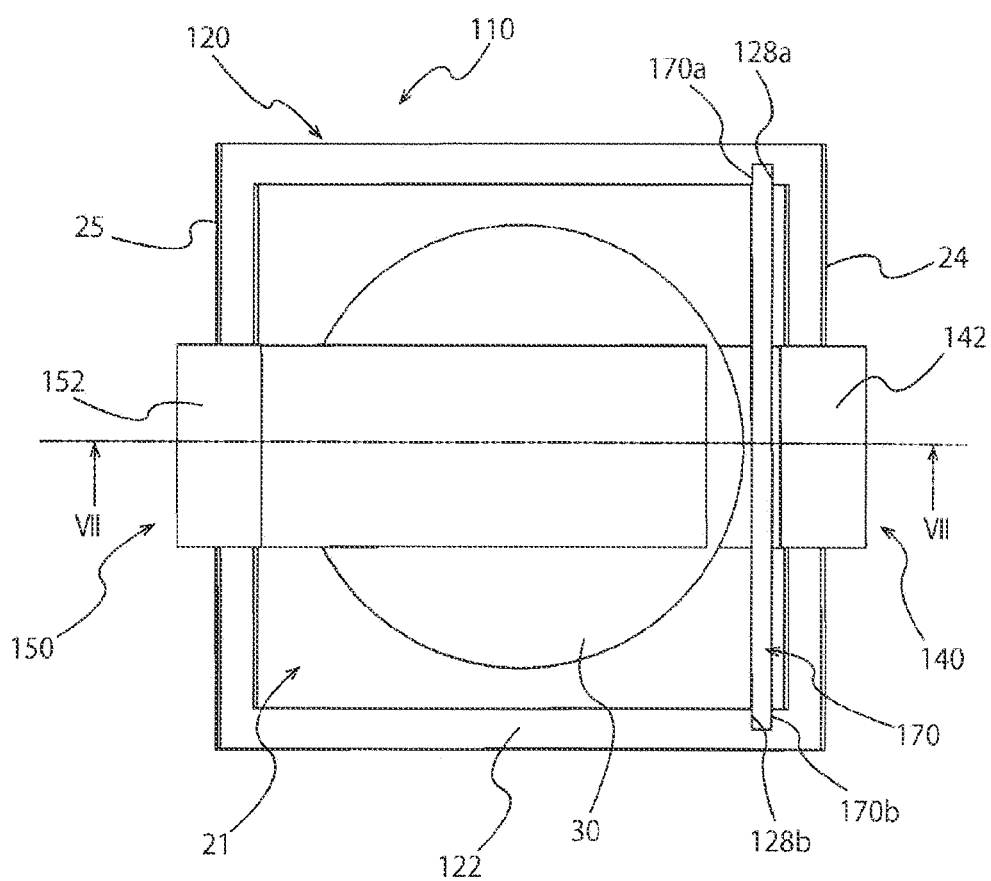
FIG. 5 is a bottom view of an electronic device according to a second embodiment.
Figure 6:
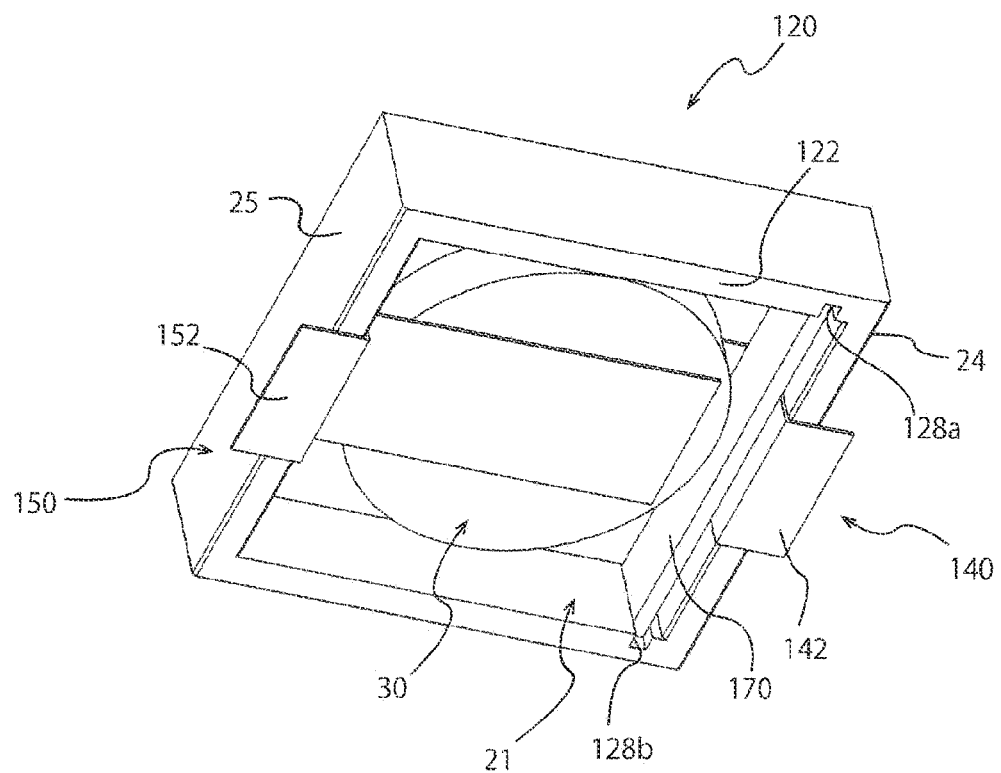
FIG. 6 is a perspective view of the electronic device shown in FIG. 5 when viewed obliquely from below.
Figure 7:
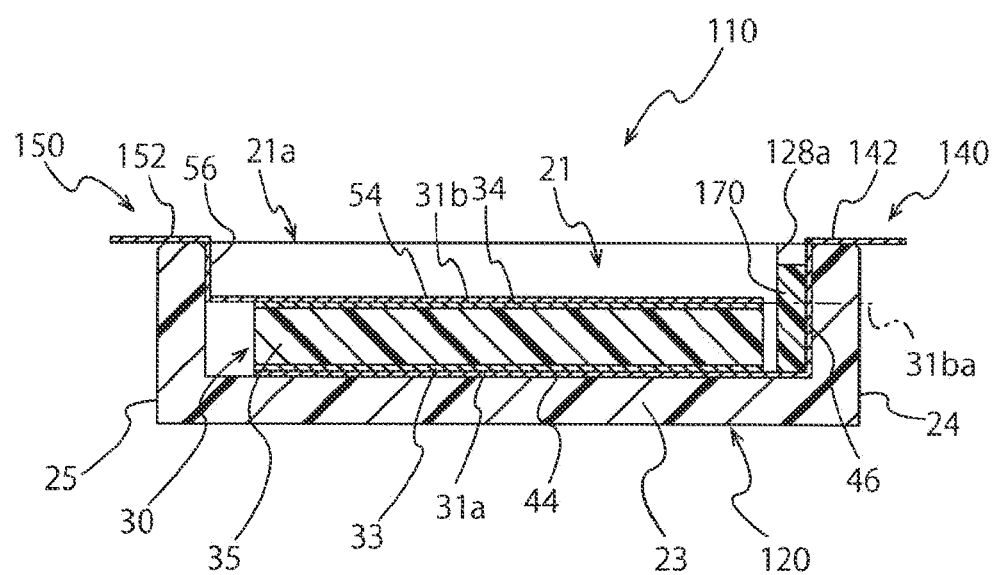
FIG. 7 is a cross-sectional view of the electronic device shown in FIG. 5.

FIG. 5 is a bottom view of an electronic device 110 according to a second embodiment of the present invention, and FIG. 6 is a perspective view of the electronic device 110 when viewed obliquely from below. In addition, FIG. 7 is a cross-sectional view through a cross section passing through the approximate center of the electronic device 110 and perpendicular to a first outer side surface 24 and a second outer side surface 25. As shown in FIGS. 5 to 7, the electronic device 110 is the same as the electronic device 10 except that an insulating member 170 is arranged in the recessed portion 21 and a first mounting portion 142 of a first metal terminal 140 and a second mounting portion 152 of a second metal terminal 150 are different from those in the electronic device 10 shown in FIGS. 1 to 4. In the description of the electronic device 110, only differences from the electronic device 10 will be described, and the description of the points in common with the electronic device 10 will be omitted.

As shown in FIGS. 5 and 6, a case 120 of the electronic device 110 has a rectangular parallelepiped shape, and includes the recessed portion 21 and an opening edge portion 122 surrounding an opening of the recessed portion 21 similar to the case 20 shown in FIG. 2. As shown in FIGS. 5 to 7, in the recessed portion 21, the ceramic element 30, a first electrode connection portion 44 and a first terminal arm portion 46 of the first metal terminal 140, and a second electrode connection portion 54 and a second terminal arm portion 56 of the second metal terminal 150 are housed similar to the electronic device 10 shown in FIG. 2.

As shown in FIG. 7, the insulating member 170 is arranged between the second electrode portion 34 and the first terminal arm portion 46 in the recessed portion 21. As shown in FIGS. 5 and 6, the insulating member 170 has an elongated rectangular parallelepiped shape, and is arranged so that its longitudinal direction is approximately parallel to the first outer side surface 24 of the case 120. As shown in FIG. 5, when the electronic device 110 is viewed from below, which is the mounting surface side, the insulating member 170 is arranged between the ceramic element 30 and the first mounting portion 142 so as to traverse the recessed portion 21.

In addition, as shown in FIG. 7, it is preferable that the insulating member 170 is arranged in the recessed portion 21 so as to cross an extended surface 31ba of the second main surface 31b of the ceramic element 30. Furthermore, it is also preferable that the insulating member 170 blocks the shortest imaginary line (matching the extended surface 31ba in FIG. 7) that connects the second electrode portion 34 and the first terminal arm portion 46 to each other along the extended surface 31ba of the second main surface 31b. With such an arrangement, the insulation between the second electrode portion 34 and the first terminal arm portion 46 electrically connected to the first electrode portion 33 can be effectively improved.

As shown in FIG. 7, a part of the first metal terminal 140 electrically connected to the first electrode portion 33 facing the upper base 23 side is exposed from the recessed portion 21 through the opening 21a. For this reason, in the electronic device 110, the first terminal arm portion 46 passes near the second electrode portion 34 facing the opening 21a side of the ceramic element 30. However, in the electronic device 110, the insulating member 170 is arranged between the second electrode portion 34 and the first terminal arm portion 46. Therefore, the insulation distance between the second electrode portion 34 and the first terminal arm portion 46 can be appropriately secured even in the narrow recessed portion 21. In addition, in the electronic device 110, a through hole or the like for exposing a part of the first metal terminal 140 to the outside of the recessed portion 21 does not need to be formed in the upper base 23 or the side wall of the case 120. Therefore, when the electronic device 110 is resin-molded, a problem that the resin leaks from the recessed portion 21 to the outside can be prevented.

As shown in FIGS. 5 and 6, in the case 120 of the electronic device 110, a pair of groove portions 128a and 128b that are open to the opening edge portion 122 and the recessed portion 21 are formed. The groove portions 128a and 128b are arranged so as to face each other with the recessed portion 21 interposed therebetween. As shown in FIGS. 5 and 6, one end 170a of the insulating member 170 is in the groove portion 128a, and the other end 170b of the insulating member 170 is in the groove portion 128b.

In the manufacturing of the electronic device 110, similar to the manufacturing of the electronic device 10, the first and second metal terminals 140 and 150 are fixed to the ceramic element 30 and then arranged in the opening edge portion 122 and the recessed portion 21 of the case 120. Furthermore, one end 170a and the other end 170b of the insulating member 170 are inserted and fixed into the groove portions 128a and 128b, respectively, thereby obtaining the electronic device 110. In addition, in the manufacturing of the electronic device 110, a step of filling resin into the recessed portion 21 may be added as in the electronic device 10.

Since the groove portions 128a and 128b are formed in the case 120, the insulating member 170 can be positioned easily and accurately during manufacturing. In addition, although both the ends 170a and 170b of the insulating member 170 shown in FIGS. 5 and 6 are in the groove portions 128a and 128b, only one end 170a (or the other end 170b) of the insulating member 170 may be in the groove portion 128a (or the groove portion 128b). Also in such a modification example, effects such as each positioning are obtained. The material of the insulating member 170 is not particularly limited. For example, the same resin material as the case 20 or a different resin material from the case 20 can be used.

As shown in FIGS. 5 to 7, the first and second metal terminals 140 and 150 of the electronic device 110 do not include the first and second folded portions 47 and 57 of the first and second metal terminals 40 and 50 shown in FIG. 2. As shown in FIG. 6, in the first and second mounting portions 142 and 152 of the first and second metal terminals 140 and 150, for example, even if the width of the opening edge portion 122 is narrow, a larger area of the surface facing the mounting surface side in the mounting portions 142 and 152 can be secured. In addition, the first and second metal terminals 140 and 150 may have the same shapes as the first and second metal terminals 40 and 50 shown in FIG. 2, and the electronic device 10 shown in FIG. 2 may adopt the shapes of the first and second metal terminals 140 and 150 shown in FIG. 6.

In addition, as for the points in common with the electronic device 10 according to the first embodiment, the electronic device 110 according to the second embodiment has the same effects as the electronic device 10.

Third Embodiment

Figure 8:
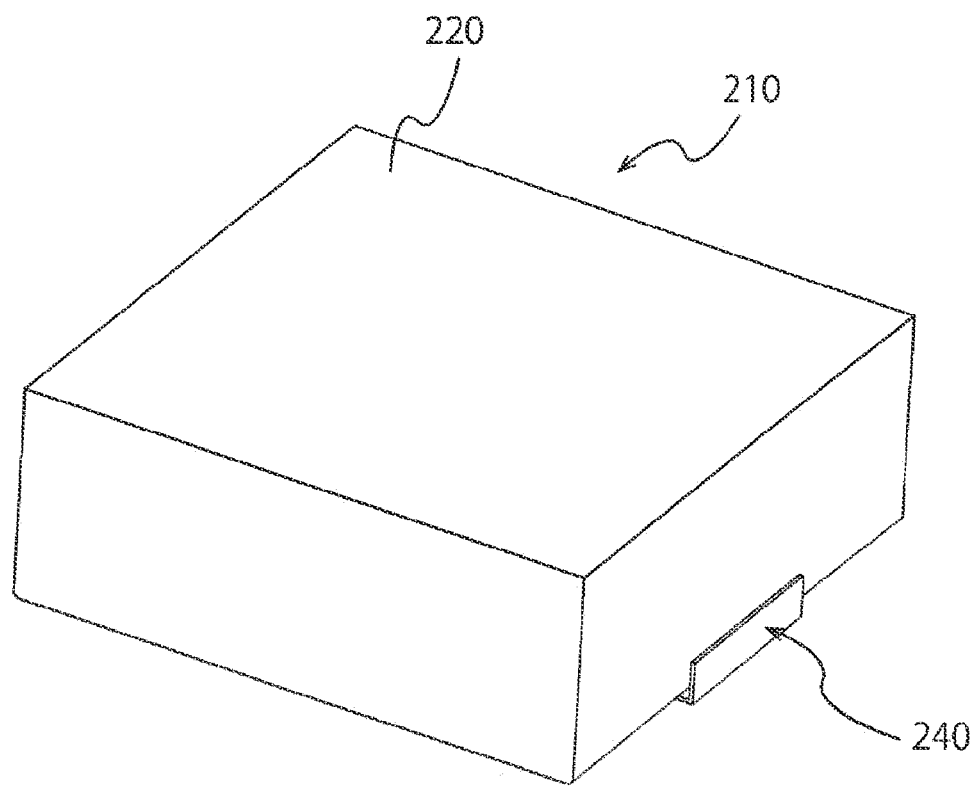
FIG. 8 is a schematic perspective view of an electronic device according to a third embodiment of the present invention when viewed obliquely from above.
Figure 9:
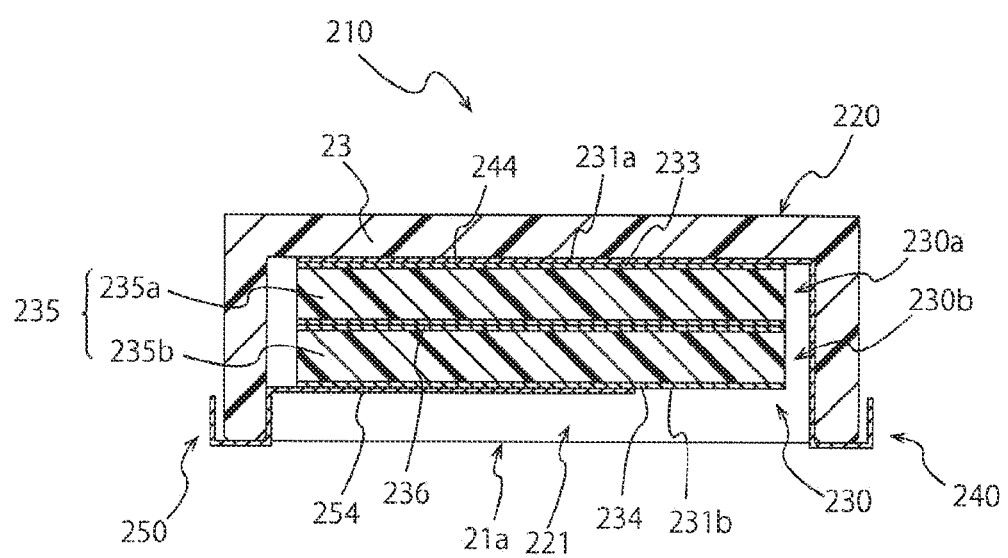
FIG. 9 is a cross-sectional view of the electronic device shown in FIG. 8.

FIG. 8 is a schematic perspective view of an electronic device 210 according to a third embodiment of the present invention when viewed obliquely from above. In addition, FIG. 9 is a cross-sectional view of the electronic device 210. As shown in FIG. 8, the electronic device 210 has a larger dimension in the height direction than the electronic device 10 shown in FIG. 1, but the shape of the electronic device 210 in plan view is the same as the shape of the electronic device 10 in plan view.

As shown in FIG. 9, the electronic device 210 is different from the electronic device 10 shown in FIGS. 1 to 4 in that a ceramic element 230 arranged in a recessed portion 221 is formed by combining two single-plate dielectric elements of a first portion 230a and a second portion 230b. However, a case 220, a case cover 260, a first metal terminal 240, and a second metal terminal 250 other than the ceramic element 230 in the electronic device 210 are the same as those in the electronic device 10 according to the first embodiment except that their dimensions in the depth direction, which is a direction from the opening of the case 220 to the bottom surface (upper base 23) of the recessed portion 221, are different. In the description of the electronic device 210, only differences from the electronic device 10 will be described, and the description of the points in common with the electronic device 10 will be omitted.

As shown in FIG. 9, the ceramic element 230 of the electronic device 210 includes the first portion 230a and the second portion 230b. The first portion 230a is arranged near the upper base 23 of the recessed portion 221, and the second portion 230b is arranged near the opening 21a of the recessed portion 221.

The first portion 230a has a first main surface 231a, a first electrode portion 233, and a first dielectric portion 235a. The first dielectric portion 235a forms a part of a dielectric portion 235 of the ceramic element 230. A first electrode connection portion 244 of the first metal terminal 240 is connected to the first electrode portion 233, similar to the first electrode portion 33 shown in FIG. 4.

The second portion 230b has a second main surface 231b, a second electrode portion 234, and a second dielectric portion 235b. The second dielectric portion 235b forms another part of the dielectric portion 235 of the ceramic element 230. A second electrode connection portion 254 of the second metal terminal 250 is connected to the second electrode portion 234, similar to the second electrode portion 34 shown in FIG. 4.

As shown in FIG. 9, the first portion 230a and the second portion 230b are in contact with each other through intermediate electrode portions 236 formed on surfaces facing each other, and are electrically connected in series to each other. As materials of the intermediate electrode portion 236, copper, a copper alloy, nickel, a nickel alloy, silver, an alloy of silver and palladium, and the like can be used, similar to the first electrode portion 233 and the second electrode portion 234.

In the electronic device 210 shown in FIGS. 8 and 9, the ceramic element 230 arranged in the recessed portion 221 is not a single plate unlike in the electronic device 10, but is formed by combining the first portion 230a and the second portion 230b that are a plurality of plate-like dielectrics. Such an electronic device 210 functions as a capacitor in which the first dielectric portion 235a and the second dielectric portion 235b are connected in series to each other and the like. In addition, as for the points in common with the electronic device 10, the electronic device 210 has the same effects as the electronic device 10.

Fourth Embodiment

Figure 10:
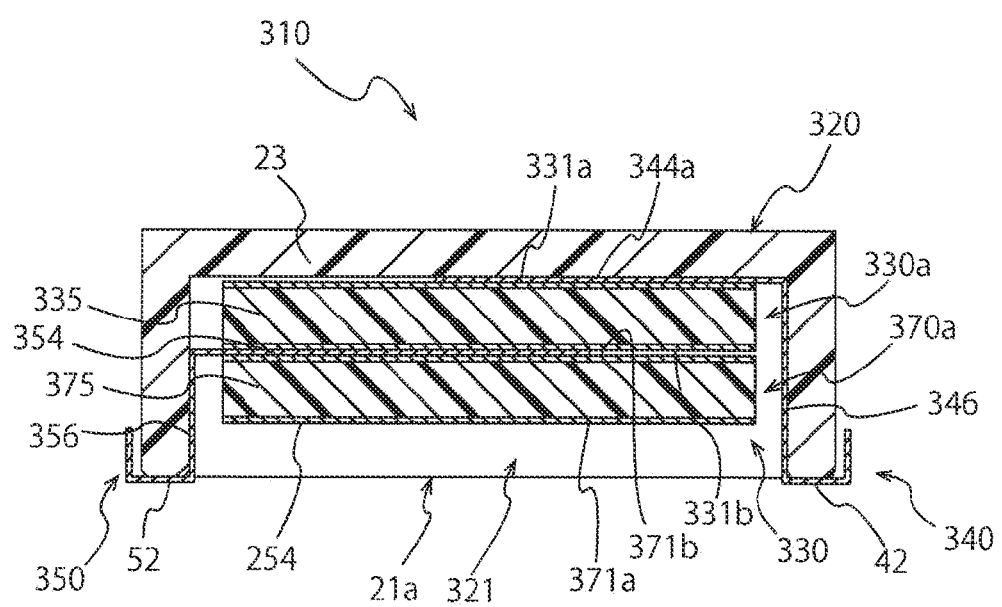
FIG. 10 is a cross-sectional view of an electronic device according to a fourth embodiment.
Figure 11:
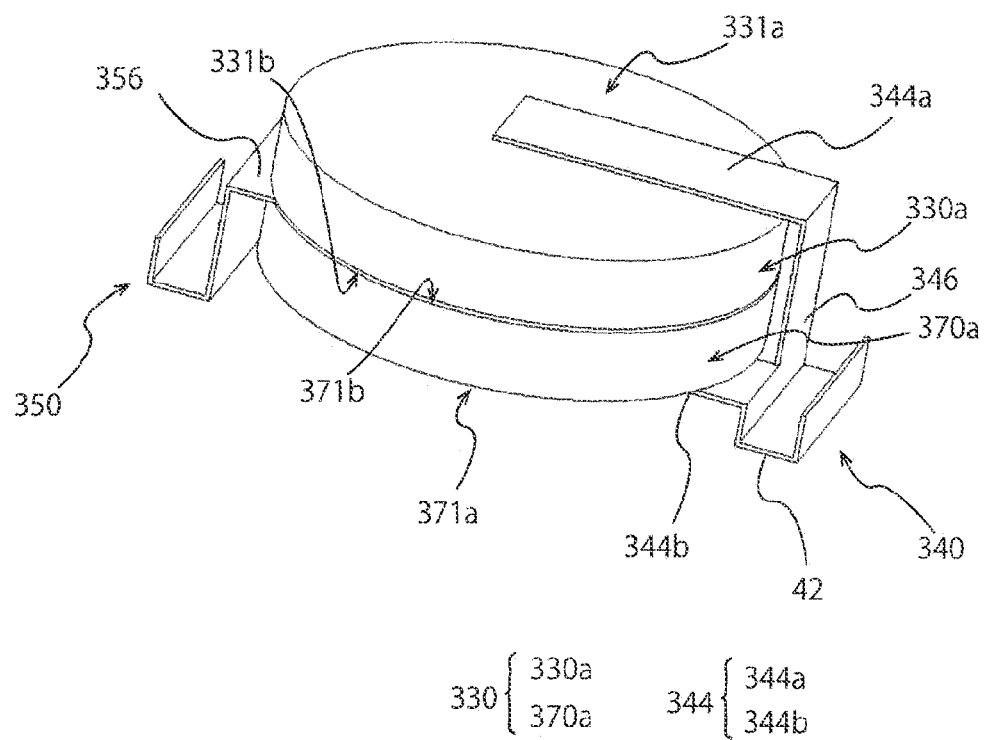
FIG. 11 is a perspective view showing a portion of the electronic device shown in FIG. 10 other than a case.

FIG. 10 is a cross-sectional view of an electronic device 310 according to a fourth embodiment of the present invention. In addition, FIG. 11 is a schematic perspective view showing a portion of the electronic device 310 other than a case 320. In addition, the shape of the electronic device 310 when viewed obliquely from above is the same as that of the electronic device 210 shown in FIG. 8.

As shown in FIG. 10, the electronic device 310 is different from the electronic device 10 shown in FIGS. 1 to 4 in that a ceramic element 330 is formed by combining two single-plate dielectric elements of a first element portion 330a and a second element portion 370a and the shapes of a first metal terminal 340 and a second metal terminal 350 are different from the shapes of the first metal terminal 40 and the second metal terminal 50. However, the case 320 of the electronic device 310 is the same as the case 20 of the electronic device 10 according to the first embodiment except that their dimensions in the depth direction, which is a direction from the opening of the case 320 to the upper base 23 of the recessed portion 321, are different. The description of the electronic device 310 will be focused on the points of difference from the electronic device 10, and the description of the points in common with the electronic device 10 will be omitted.

As shown in FIG. 10, the first element portion 330a of the electronic device 310 is arranged near the upper base 23 of the recessed portion 321. The first element portion 330a has a first main surface 331a and a second main surface 331b facing each other and a dielectric portion 335, and is similar to the ceramic element 30 of the electronic device 10 shown in FIG. 2. In addition, similar to the ceramic element 30, the first element portion 330a of the electronic device 310 includes a first electrode portion formed on the first main surface 331a and a second electrode portion formed on the second main surface 331b.

The second element portion 370a of the electronic device 310 is arranged near the opening 21a of the recessed portion 321. Similar to the first element portion 330a, the second element portion 370a has a first main surface 371a, a second main surface 371b, and a dielectric portion 375. However, contrary to the first element portion 330a, the second element portion 370a is arranged in such a posture that the second main surface 371b faces upward (upper base 23 side of the recessed portion 321).

Therefore, the first element portion 330a and the second element portion 370a are arranged so that the second main surfaces 331b and 371b face each other. In addition, similar to the ceramic element 30, the second element portion 370a of the electronic device 310 includes a first electrode portion formed on the first main surface 371a and a second electrode portion formed on the second main surface 371b.

The second metal terminal 350 of the electronic device 310 includes a second electrode connection portion 354 interposed between the second main surfaces 331b and 371b of the first element portion 330a and the second element portion 370a so as to be in contact with the second electrode portions of both the first element portion 330a and the second element portion 370a. That is, the second electrode connection portion 354 is inserted between the first element portion 330a and the second element portion 370a. The second electrode connection portion 354 is connected to the second mounting portion 52 through a second terminal arm portion 356. As shown in FIG. 11, the schematic shape of the second metal terminal 350 is similar to that of the second metal terminal 50 (see FIG. 4) or the second metal terminal 250 (see FIG. 7).

As shown in FIG. 10, the first metal terminal 340 of the electronic device 310 includes a first electrode connection portion 344 including a first element connection portion 344a and a second element connection portion 344b branched from a first terminal arm portion 346 of the first metal terminal 340. The first element connection portion 344a is connected to a first electrode portion formed on the first main surface 331a of the first element portion 330a. In addition, the second element connection portion 344b is connected to a first electrode portion formed on the first main surface 371a of the second element portion 370a. Therefore, as shown in FIG. 11, in the electronic device 310, the entire ceramic element 330 is interposed between the first element connection portion 344a and the second element connection portion 344b of the first metal terminal 340. In addition, the first terminal arm portion 346 electrically connects the first element connection portion 344a and the second element connection portion 344b to the second mounting portion 52.

In the electronic device 310 shown in FIG. 10, the ceramic element 330 arranged in the recessed portion 321 is not a single plate unlike in the electronic device 10, but is formed by combining a plurality of plate-like element portions 330a and 370a. Such an electronic device 310 functions as a capacitor in which the dielectric portion 335 of the first element portion 330a and the dielectric portion 375 of the second element portion 370a are connected in parallel to each other and the like. In addition, as for the points in common with the electronic device 10, the electronic device 310 has the same effects as the electronic device 10.

In addition, as the first portion 230a, the second portion 230b, the first element portion 330a, and the second element portion 370a of the third and fourth embodiments, a single-plate dielectric element similar to the ceramic element 30 of the first embodiment can be used. Therefore, by preparing the cases 20, 220, and 320 or the metal terminals 30, 40, 230, 240, 330, and 340 having different shapes, the electronic devices 10, 210, and 310 with different properties can be manufactured using the same single-plate ceramic element 30.

EXPLANATIONS OF LETTERS OR NUMERALS 10, 110, 210, 310 ELECTRONIC DEVICE
20, 120, 220, 320 CASE
21, 221, 321 RECESSED PORTION
21a OPENING
22, 122 OPENING EDGE PORTION
22a, 22b CHAMFERED PORTION
23 UPPER BASE
24 FIRST OUTER SIDE SURFACE
25 SECOND OUTER SIDE SURFACE
128a, 128b GROOVE PORTION
30, 230, 330 CERAMIC ELEMENT
230a FIRST PORTION
230b SECOND PORTION
330a FIRST ELEMENT PORTION
370a SECOND ELEMENT PORTION
31a, 231a, 331a, 371a FIRST MAIN SURFACE
33, 233 FIRST ELECTRODE PORTION
31b, 231b, 331b, 371b SECOND MAIN SURFACE
34, 234 SECOND ELECTRODE PORTION
35, 235, 335, 375 DIELECTRIC PORTION
235a FIRST DIELECTRIC PORTION
235b SECOND DIELECTRIC PORTION
236 INTERMEDIATE ELECTRODE PORTION
W1 ELEMENT THICKNESS
W2 RECESSED PORTION DEPTH
40, 140, 240, 340 FIRST METAL TERMINAL
42, 142 FIRST MOUNTING PORTION
42a, 52a DISTAL END
44, 244, 344 FIRST ELECTRODE CONNECTION PORTION
344a FIRST ELEMENT CONNECTION PORTION
344b SECOND ELEMENT CONNECTION PORTION
47 FIRST FOLDED PORTION
46, 346 FIRST TERMINAL ARM PORTION
50, 150, 250, 350 SECOND METAL TERMINAL
52, 152 SECOND MOUNTING PORTION
54, 254, 354 SECOND ELECTRODE CONNECTION PORTION
56, 356 SECOND TERMINAL ARM PORTION
57 SECOND FOLDED PORTION
D1, D2 DISTANCE
170 INSULATING MEMBER
170a ONE END
170b THE OTHER END

What is claimed is:

1. An electronic device, comprising:
a case including a recessed portion and an opening edge portion of the recessed portion;
a ceramic element arranged in the recessed portion, having a first main surface and a second main surface facing each other, and including a first electrode portion formed on the first main surface and a second electrode portion formed on the second main surface, in which the first main surface and the second main surface are a pair of surfaces having a largest area in the ceramic element;
a first metal terminal including a first mounting portion arranged on the opening edge portion and approximately parallel to the first main surface and the second main surface, and a first electrode connection portion connected to the first electrode portion; and
a second metal terminal including a second mounting portion arranged on the opening edge portion and approximately horizontal with respect to the first main surface and the second main surface, and a second electrode connection portion connected to the second electrode portion.

2. The electronic device according to claim 1, wherein a recessed portion depth, which is a distance from an opening of the case to a bottom surface of the recessed portion, is larger than an element thickness, which is a distance between the first main surface and the second main surface.

3. The electronic device according to claim 1, wherein the ceramic element includes a first portion having the first main surface, the first electrode portion, and a first dielectric portion, and a second portion having the second main surface, the second electrode portion, and a second dielectric portion, and
the first portion and the second portion are connected to each other through an intermediate electrode portion.

4. The electronic device according to claim 1, wherein the first metal terminal includes a first terminal arm portion for connecting the first electrode connection portion and the first mounting portion to each other, and
an insulating member is arranged between the second electrode portion and the first terminal arm portion in the recessed portion.

5. The electronic device according to claim 1, wherein at least a part of the opening edge portion on the case is visible from below.

6. The electronic device according to claim 1,
wherein the first metal terminal includes a first folded portion extending upward along an outer side surface of the case from a distal end of the first mounting portion, and
the second metal terminal includes a second folded portion extending upward along an outer side surface of the case from a distal end of the second mounting portion.

7. An electronic device, comprising:
a case including a recessed portion and an opening edge portion of the recessed portion;
a ceramic element arranged in the recessed portion, having a first main surface and a second main surface facing each other, and including a first electrode portion formed on the first main surface and a second electrode portion formed on the second main surface;
a first metal terminal including a first mounting portion arranged on the opening edge portion and approximately parallel to the first main surface and the second main surface, and a first electrode connection portion connected to the first electrode portion; and
a second metal terminal including a second mounting portion arranged on the opening edge portion and approximately horizontal with respect to the first main surface and the second main surface, and a second electrode connection portion connected to the second electrode portion,
wherein the ceramic element includes a first element portion and a second element portion each having the first main surface and the second main surface,
the second main surface of the first element portion and the second main surface of the second element portion are arranged to face each other,
the second electrode connection portion is interposed between the second main surface of the first element portion and the second main surface of the second element portion so as to be in contact with the second electrode portion of the first element portion and the second electrode portion of the second element portion, and
the first electrode connection portion includes a first element connection portion connected to the first electrode portion of the first element portion and a second element connection portion connected to the first electrode portion of the second element portion.

8. An electronic device, comprising:
a case including a recessed portion and an opening edge portion of the recessed portion;
a ceramic element arranged in the recessed portion, having a first main surface and a second main surface facing each other, and including a first electrode portion formed on the first main surface and a second electrode portion formed on the second main surface;
a first metal terminal including a first mounting portion arranged on the opening edge portion and approximately parallel to the first main surface and the second main surface, and a first electrode connection portion connected to the first electrode portion; and
a second metal terminal including a second mounting portion arranged on the opening edge portion and approximately horizontal with respect to the first main surface and the second main surface, and a second electrode connection portion connected to the second electrode portion,
wherein the first metal terminal includes a first terminal arm portion for connecting the first electrode connection portion and the first mounting portion to each other,
an insulating member is arranged between the second electrode portion and the first terminal arm portion in the recessed portion,
a groove portion is provided in the case to open to the recessed portion and to open from the opening edge portion, and
at least one end of the insulating member is in the groove portion.

\* \* \* \* \*